(12) United States Patent
Lv et al.

(10) Patent No.: US 9,621,049 B2
(45) Date of Patent: Apr. 11, 2017

(54) FEEDBACK DEVICE FOR A POWER SUPPLY

(71) Applicant: Emerson Network Power, Energy Systems, North America, Inc., Warrenville, IL (US)

(72) Inventors: Huajun Lv, Xi'an (CN); Hongbo Zhang, Xi'an (CN); Shuwen Jia, Xi'an (CN)

(73) Assignee: Emerson Network Power, Energy Systems, North America, Inc., Warrenville, IL (US)

( * ) Notice: Subject to any disclaimer, the term of this patent is extended or adjusted under 35 U.S.C. 154(b) by 765 days.

(21) Appl. No.: 13/959,241

(22) Filed: Aug. 5, 2013

(65) Prior Publication Data

US 2014/0042810 A1 Feb. 13, 2014

(30) Foreign Application Priority Data

Aug. 13, 2012 (CN) .......................... 2012 1 0286473

(51) Int. Cl.
*H02M 3/335* (2006.01)
*H02M 1/00* (2006.01)

(52) U.S. Cl.
CPC ... *H02M 3/33507* (2013.01); *H02M 3/33561* (2013.01); *H02M 2001/0003* (2013.01); *H02M 2001/0025* (2013.01); *Y10T 307/406* (2015.04)

(58) Field of Classification Search
None
See application file for complete search history.

(56) References Cited

U.S. PATENT DOCUMENTS

| 5,285,368 | A | * | 2/1994 | Ishikawa | G03G 15/0283 363/21.05 |
| 5,663,874 | A | * | 9/1997 | Mader | H02M 3/33507 363/131 |
| 6,370,040 | B2 | * | 4/2002 | Hosotani | H02M 3/3385 363/19 |
| 7,911,081 | B2 | * | 3/2011 | Cyr | H02M 3/33561 307/17 |
| 8,644,036 | B2 | * | 2/2014 | Sato | H02M 3/33523 363/21.04 |

(Continued)

*Primary Examiner* — Fritz M Fleming
*Assistant Examiner* — David Shiao
(74) *Attorney, Agent, or Firm* — Harness, Dickey & Pierce, P.L.C.

(57) ABSTRACT

The present invention relates to a feedback device for a power supply, including a main feedback module, an auxiliary feedback module and a feedback control module. The main feedback module is adapted to sample a voltage on a main output branch of the power supply, and output a main feedback voltage to the feedback control module. The auxiliary feedback module is adapted to reduce the main feedback voltage when a voltage on an auxiliary output branch of the power supply drops. The feedback control module is adapted to control the power supply to increase its power output when the main feedback voltage decreases, so that the voltage on the auxiliary output branch is restored to normal. By using the power supply feedback device of the present invention, the circuit is simple, not only solving voltage sag problems, but also ensuring the power density and cost.

19 Claims, 8 Drawing Sheets

(56) References Cited

U.S. PATENT DOCUMENTS

| | | | |
|---|---|---|---|
| 8,814,327 B2* | 8/2014 | Takayanagi | B41J 29/38 347/58 |
| 2002/0018352 A1* | 2/2002 | L'Hermite | H02M 3/33523 363/41 |
| 2008/0211312 A1* | 9/2008 | Zhou | H02M 3/33507 307/75 |

* cited by examiner

FEEDBACK DEVICE FOR A POWER SUPPLY

FIELD OF THE INVENTION

This application claims the benefit and priority of Chinese Patent Application No. 201210286473.3 filed Aug. 13, 2012. The entire disclosure of the above application is incorporated herein by reference.

FIELD OF THE INVENTION

The present invention relates to the field of switched-mode power supplies, and in particular to a feedback device for a power supply.

BACKGROUND OF THE INVENTION

The power supply is a very basic and important component of an electronic circuit. A common power supply has a main output branch, a plurality of auxiliary output branches and a feedback circuit for the main output branch. Accordingly, only the main output branch is provided with a feedback process, and thus has a good load response speed; however, due to lack of a feedback process, the auxiliary output branches have a poor load response speed, which may result in the undervoltage phenomena, and affect normal operation of the circuit.

In view of the technical problem, an existing solution is to increase the number and capacitance of the capacitors in the auxiliary output branches. A sufficiently large capacitance allows the auxiliary output branches to have a sufficiently long hold-up time, thereby lowering the probability of the undervoltage event on the auxiliary output branches. Such a solution has a simple circuit structure, but fails to fundamentally solve the problem and merely lowers the probability of faults. Besides, when there area greater number of capacitors, they take up a larger space to be disposed, which affects the power density, and the cost will increase.

Accordingly, it is needed to provide a feedback device for a power supply that not only fundamentally solves undervoltage problems but also ensures the power density.

SUMMARY OF THE INVENTION

A technical problem to be solved by the present invention is to, in view of the defect that conventional, existing power supply feedback devices cannot fundamentally solve undervoltage problems and have a low power density, provide a feedback device for a power supply that not only fundamentally solves undervoltage problems but also ensures the power density.

The solution of the present invention for solving the technical problem is providing a feedback device for a power supply, which includes: a main feedback module, an auxiliary feedback module and a feedback control module, wherein the main feedback module is adapted to sample a voltage on a main output branch of the power supply, and output a main feedback voltage to the feedback control module;

the auxiliary feedback module is adapted to reduce the main feedback voltage when a voltage on an auxiliary output branch of the power supply drops;

the feedback control module is adapted to control the power supply to increase its power output when the main feedback voltage decreases, so that the voltage on the auxiliary output branch is restored to normal.

In the feedback device for a power supply described in the present invention, the main feedback module includes a first resistor, a second resistor, a third resistor and a fourth resistor; the first resistor, the second resistor and the third resistor are sequentially connected in series between a main feedback sampling point of the main output branch and ground; the fourth resistor has one terminal connected to a feedback output point of the main feedback module and the other terminal connected to a feedback receiving point of the feedback control module.

In the feedback device for a power supply described in the present invention, the auxiliary feedback module is connected between an auxiliary feedback sampling point of the auxiliary output branch and a feedback shunting point of the main feedback module, and is adapted to turn on when the voltage on the auxiliary output branch of the power supply drops, so as to shunt a main feedback current flowing through the main feedback module and reduce the main feedback voltage.

In the feedback device for a power supply described in the present invention, the auxiliary feedback module includes a first diode; the first diode has a cathode connected to the auxiliary feedback sampling point of the auxiliary output branch, and an anode connected directly or via a fifth resistor to the feedback shunting point of the main feedback module.

In the feedback device for a power supply described in the present invention, the auxiliary feedback module further includes a first capacitor, the first capacitor has a positive terminal connected to the cathode of the first diode, and a negative terminal connected to the feedback shunting point of the main feedback module; or the first capacitor is connected in parallel with the fifth resistor.

In the feedback device for a power supply described in the present invention, the auxiliary feedback module further includes a sixth resistor; the sixth resistor is connected in series with the first capacitor, for current limiting for the first capacitor.

In the feedback device for a power supply described in the present invention, the sixth resistor is connected between the negative terminal of the first capacitor and the feedback shunting point of the main feedback module; or the sixth resistor is connected to the positive terminal of the first capacitor and the cathode of the first diode; or the sixth resistor is connected between the positive terminal of the first capacitor and the anode of the first diode.

In the feedback device for a power supply described in the present invention, the feedback shunting point is arranged between the first resistor and the second resistor of the main feedback module.

In the feedback device for a power supply described in the present invention, the feedback output point is arranged between the second resistor and the third resistor of the main feedback module.

In the feedback device for a power supply described in the present invention, the feedback device for a power supply includes at least two auxiliary feedback modules, which are in one-to-one correspondence with auxiliary output branches of the power supply.

By using the power supply feedback device of the present invention, the voltages on the main output branch and the at least one or plurality of auxiliary output branches can be monitored in real time, and when the voltage on any one of the output branches decreases, the PWM duty cycle of the transformer module can be timely adjusted by the feedback control module, thus offering good adaptivity. Moreover, the circuit is simple. Voltage sag problems are solved, and the power density and cost are both ensured.

BRIEF DESCRIPTION OF THE DRAWINGS

The present invention will be further described below, in conjunction with the accompanying drawings and the embodiments. Of the accompanying drawings.

DETAILED DESCRIPTION OF THE INVENTION

Figure 1:
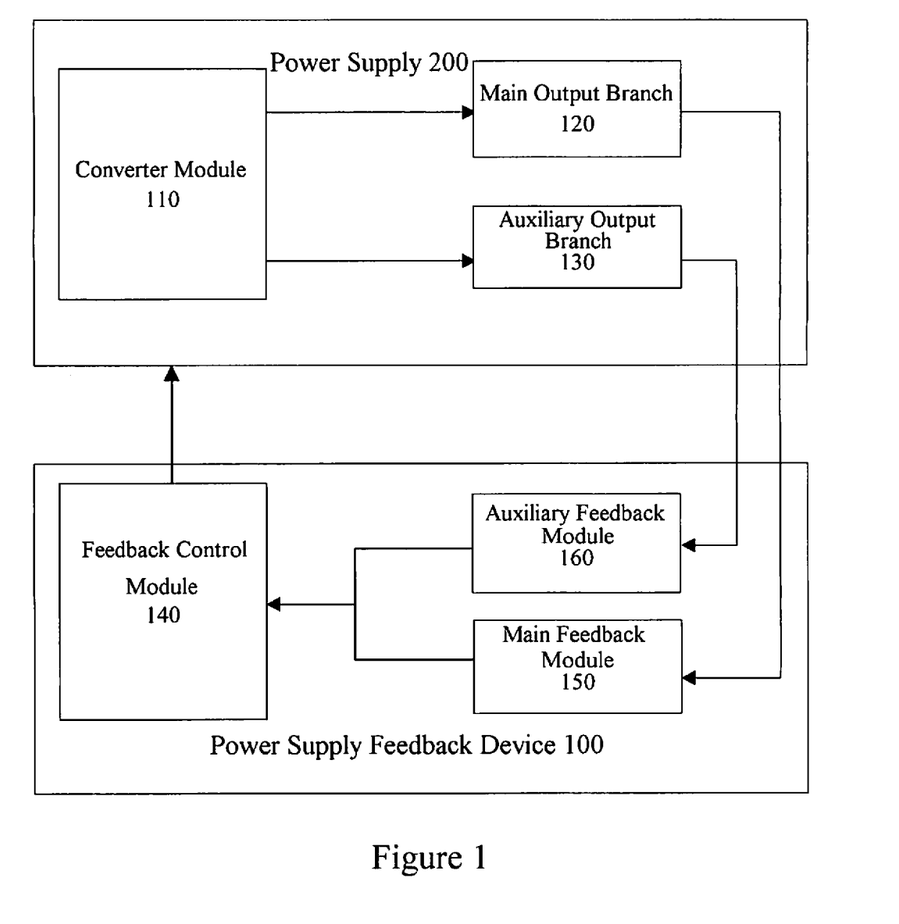
FIG. 1 is a schematic block diagram of a feedback device for a power supply according to a first embodiment of the present invention.

FIG. 1 is a schematic block diagram of a feedback device for a power supply according to a first embodiment of the present invention. As shown in FIG. 1, the power supply feedback device 100 includes a main feedback module 150, an auxiliary feedback module 160 and a feedback control module 140. The power supply 200 includes a converter module 110, a main output branch 120 and an auxiliary output branch 130.

The converter module 110 is adapted to receive an input voltage and convert the input voltage into a main output voltage and an auxiliary output voltage. For example, the converter module 110 may be a DC-DC converter or an AC-DC converter; or a forward converter or a flyback converter. Any converter well known in the art may be used in the present invention. The main output branch 120 receives the main output voltage from a main output terminal of the transformer module 110 and then supplies it to a main load (not shown). The auxiliary output branch 130 receives the auxiliary output voltage from an auxiliary output terminal of the transformer module 110, and then supplies it to an auxiliary load (not shown). The main output branch 120 and the auxiliary output branch 130 may be any output branches known in the prior art, or any output branches that have a particular function based on a specific design.

The main feedback module 150 is adapted to sample the voltage on the main output branch 120 of the power supply, and output a main feedback voltage to the feedback control module 140. The auxiliary feedback module 160 is adapted to reduce the main feedback voltage when the voltage on the auxiliary output branch 130 of the power supply drops. The feedback control module 140 is adapted to control the power supply to increase its power output when the main feedback voltage decreases, so that the voltage on the auxiliary output branch 130 is restored to normal.

Those skilled in the art understand that, although the power supply 200 shown in FIG. 1 includes only one auxiliary output branch 130, and the power supply feedback device 100 includes only one auxiliary feedback module 160, in practical applications, the power supply 200 may include two or more auxiliary output branches 130, and each of the auxiliary output branches 130 corresponds to one auxiliary feedback module 160 of the power supply feedback device 100. As a matter of course, the power supply feedback device 100 of the present invention may include only one auxiliary feedback module 160, which may be used for a power supply 200 including one or a plurality of auxiliary output branches 130.

Figure 2:
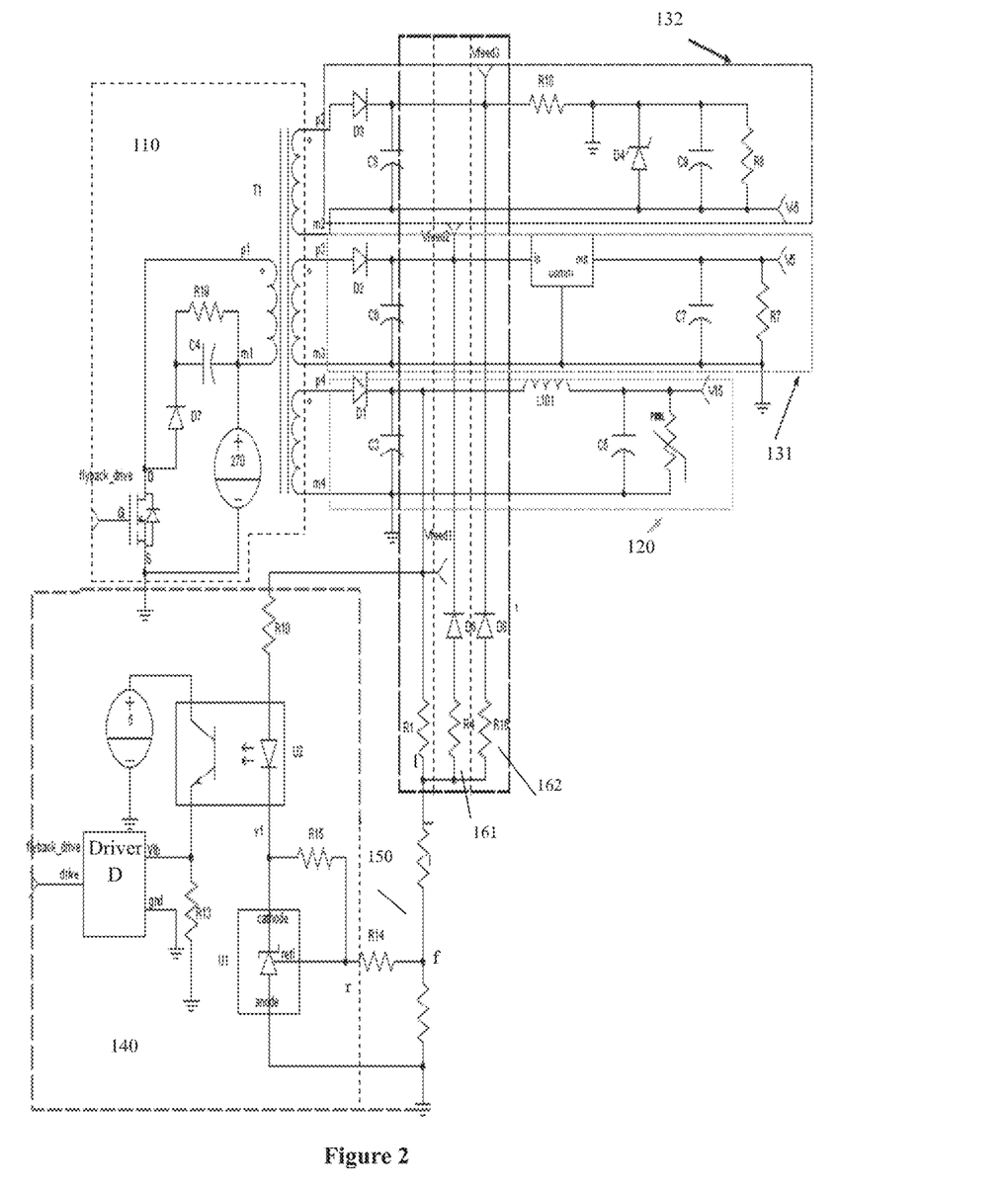
FIG. 2 is a schematic circuit diagram of a feedback device for a power supply according to a second embodiment of the present invention.

By using the power supply feedback device of the present invention, the voltages on the main output branch and the at least one or plurality of auxiliary output branches can be monitored in real time, and when the voltage on any one of the output branches decreases, the PWM duty cycle of the transformer module can be timely adjusted by the feedback control module, thus offering good adaptivity. Moreover, the circuit is simple. Voltage sag problems are solved, and the power density and cost are both ensured FIG. 2 is a schematic circuit diagram of a feedback device for a power supply according to a second embodiment of the present invention. As shown in FIG. 2, the power supply feedback device 100 of the present invention includes a feedback control module 140, a main feedback module 150, a first auxiliary feedback module 161 and a second auxiliary feedback module 162. The power supply 200 includes a converter module 110, a main output branch 120, and a first auxiliary output branch 131 and a second auxiliary output branch 132.

In this embodiment, the converter module 110 is a flyback converter. The gate of the switching tube of the flyback converter is connected to a flyback drive terminal flyback_drive of the feedback control module 140 to receive a drive signal. By controlling the duty cycle of the drive signal, the feedback control module 140 controls the converter module 110. The main output branch 120 includes a diode D1, capacitors C3 and C5, an inductor L101, and a main load PWL. The diode D1 has an anode connected to a main output terminal of the converter module 110, and a cathode connected to a main load voltage output terminal V15 via the inductor L101. The capacitor C3 has a positive terminal connected to the cathode of the diode D1, and a negative terminal grounded. The capacitor C5 has a positive terminal connected to the main load voltage output terminal V15, and a negative terminal grounded. The first auxiliary output branch 131 includes a diode D2, a capacitor C6, a capacitor C7, an auxiliary load R7 and a three-terminal voltage conversion chip. The diode D2 has an anode connected to a first auxiliary voltage output terminal of the inverter module, and a cathode connected to an input terminal in of the three-terminal voltage conversion chip and the positive terminal of the capacitor C6. The negative terminal of the capacitor C6 is grounded. The three-terminal voltage conversion chip has an output terminal out connected to the positive terminal of the capacitor C7 and an auxiliary load voltage output terminal V5, and a common terminal comm grounded. The negative terminal of the capacitor C7 is grounded. The auxiliary load R7 is connected between the auxiliary load voltage output terminal V5 and ground. The second auxiliary output branch 132 includes a diode D3, a diode D4, a capacitor C8, a capacitor C9, a resistor R18, and an auxiliary load R8. The diode D3 has an anode connected to a second auxiliary output voltage terminal of the inverter module, and a cathode connected to the positive terminal of the capacitor C8. The negative terminal of the capacitor C8 is connected to the auxiliary load voltage output terminal V-5. The cathode of the diode D3 is grounded via the resistor R18. The diode D4 has a cathode grounded, and an anode connected to the auxiliary load voltage output terminal V-5. The capacitor C9 has a positive terminal grounded, and a negative terminal connected to the auxiliary load voltage output terminal V-5.

In this present embodiment, the main feedback module 150 includes resistors R1-R3 and R14. The resistor R1 is connected between a main feedback sampling point Vfeed1 of the main output branch and ground. The resistors R1-R3 are sequentially connected in series between the main feedback sampling point Vfeed1 of the main output branch and ground. The resistor R14 has one terminal connected to a feedback output point f of the main feedback module, and the other terminal connected to a feedback receiving point r of the feedback control module. In the present embodiment, the main feedback sampling point Vfeed1 is the cathode of the diode D1. In other embodiments of the present invention, the main feedback sampling point Vfeed1 may be the main load voltage output terminal V15.

In this embodiment, the auxiliary feedback module includes the first auxiliary feedback module 161 and the second auxiliary feedback module 162. The first auxiliary feedback module 161 is connected between an auxiliary feedback sampling point Vfeed2 of the first auxiliary output branch 131 and a feedback shunting point l of the main feedback module; and the first auxiliary feedback module 161 is adapted to turn on when the voltage on the first auxiliary output branch 131 drops, so as to shunt the main feedback current flowing through the main feedback module 150 and reduce the main feedback voltage. The second auxiliary feedback module 162 is connected between an auxiliary feedback sampling point Vfeed3 of the second auxiliary output branch 132 and the feedback shunting point l of the main feedback module; and the second auxiliary feedback module 162 is adapted to turn on when the voltage on the second auxiliary output branch 132 drops, so as to shunt the main feedback current flowing through the main feedback module 150 and reduce the main feedback voltage.

As shown in FIG. 2, the first auxiliary feedback module 161 includes a diode D6 and a resistor R4. The diode D6 has a cathode connected to the auxiliary feedback sampling point Vfeed2 of the first auxiliary output branch 131, and an anode connected to the feedback shunting point l of the feedback control module via the resistor R4. The second auxiliary feedback module 162 includes a diode D8 and a resistor R16. The diode D8 has a cathode connected to the auxiliary feedback sampling point Vfeed3 of the second auxiliary output branch 132, and an anode connected to the feedback shunting point l of the feedback control module via the resistor R16.

Those skilled in the art understand that, in a simplified embodiment of the present invention, the resistors R4 and R16 may be omitted, or replaced with one or a plurality of resistors connected in series or parallel. Those skilled in the art also understand that, although the first auxiliary feedback module 161 and the second auxiliary feedback module 162 as shown in FIG. 2 are the same, in some other embodiments of the present invention, they may be different.

Those skilled in the art also understand that, in some other embodiments of the present invention, the positions of the diode D6 and the resistor R4 are interchangeable, so are the positions of the diode D8 and the resistor R16. For example, the resistor R4 may be connected between the cathode of the diode D6 and the auxiliary feedback sampling point Vfeed2 of the first auxiliary output branch 131, and the resistor R16 may be connected between the cathode of the diode D8 and the auxiliary feedback sampling point Vfeed3 of the second auxiliary output branch 132.

In addition, although FIG. 2 shows that the auxiliary feedback sampling point Vfeed2 of the first auxiliary output branch 131 is the cathode of the diode D2, the auxiliary feedback sampling point Vfeed2 of the first auxiliary output branch 131 may also be located at the positive terminal of the capacitor C7 or any other node subsequent to the diode D2. Likewise, although FIG. 2 shows that the auxiliary feedback sampling point Vfeed3 of the second auxiliary output branch 132 is the cathode of the diode D3, the auxiliary feedback sampling point Vfeed3 of the second auxiliary output branch 132 may also be located at the positive terminal of the capacitor C9 or any other node subsequent to the diode D3.

Those skilled in the art understand that, because the auxiliary output branches of the power supply as shown in FIG. 2 include only two auxiliary output branches, the auxiliary feedback modules of the power supply feedback device according to the embodiment include only the first auxiliary feedback module and the second auxiliary feedback module. However, when the power supply feedback device of the present invention is applied to a power supply including a plurality of auxiliary output branches, the auxiliary feedback modules of the present invention clearly includes a plurality of auxiliary feedback modules, and the plurality of auxiliary feedback modules are in one-to-one correspondence with the plurality of auxiliary output branches of the power supply. Further, the plurality of auxiliary feedback modules may be the same or different from each other.

Figure 3:
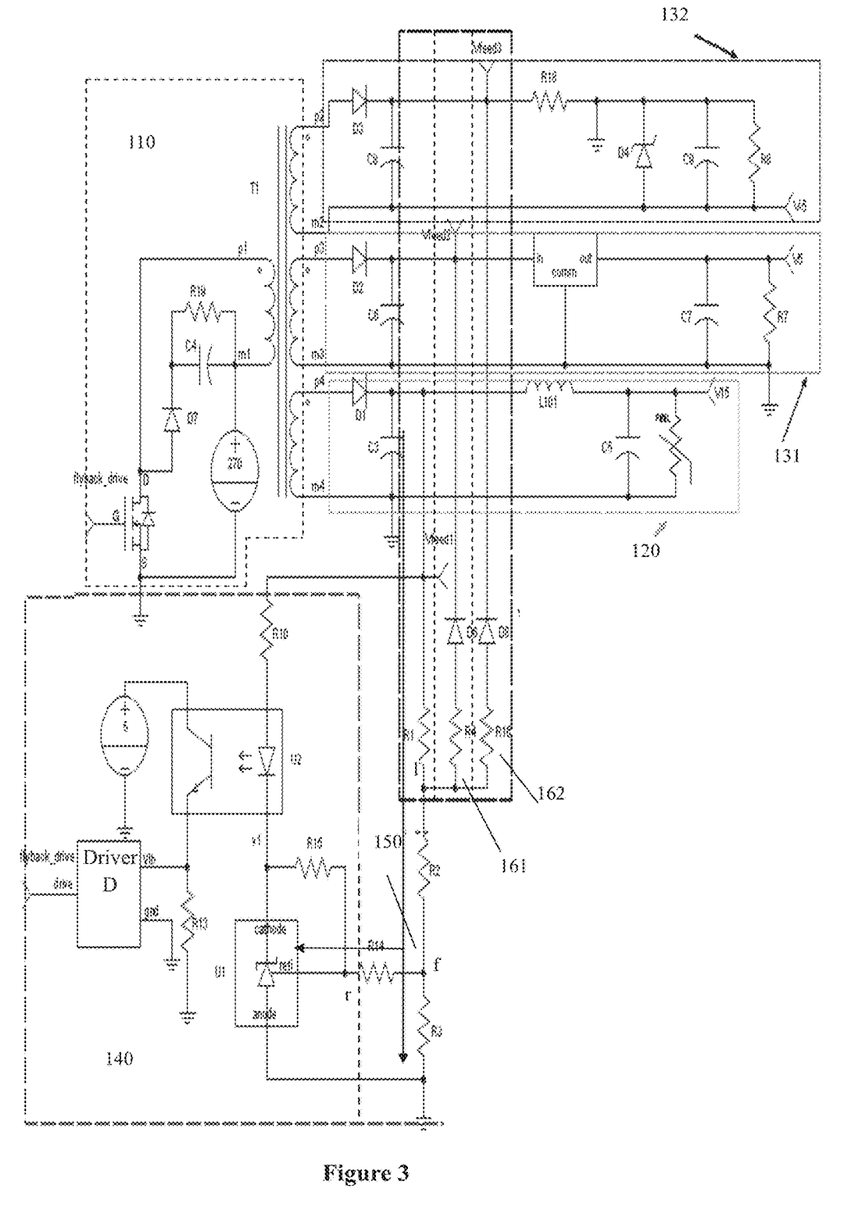
FIG. 3 is an analysis diagram of the operating principle of the feedback device for a power supply shown in FIG. 2 in stable operation.
Figure 4:
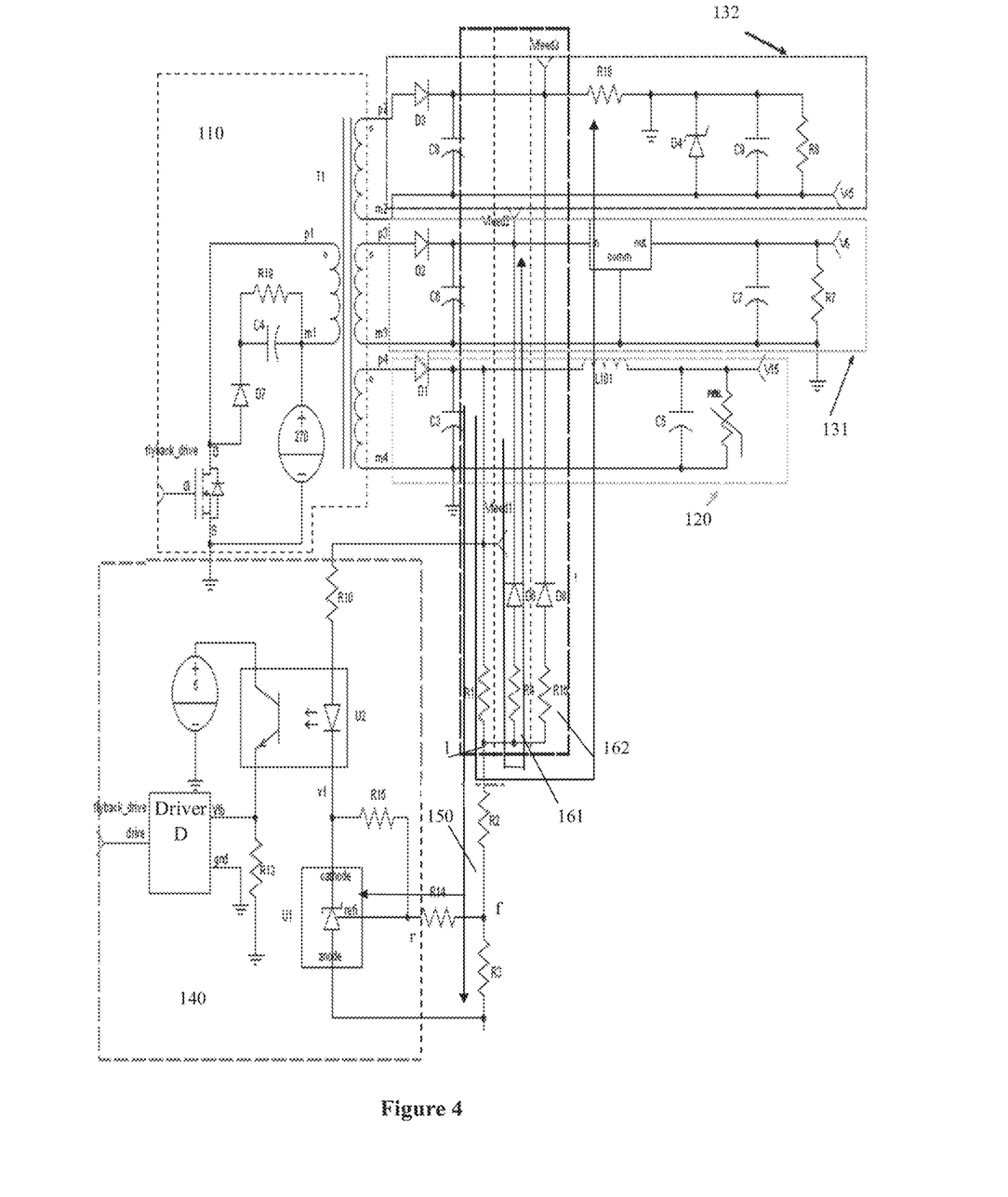
FIG. 4 is an analysis diagram of the operating principle of the feedback device for a power supply shown in FIG. 2 in voltage fluctuation.
Figure 5:
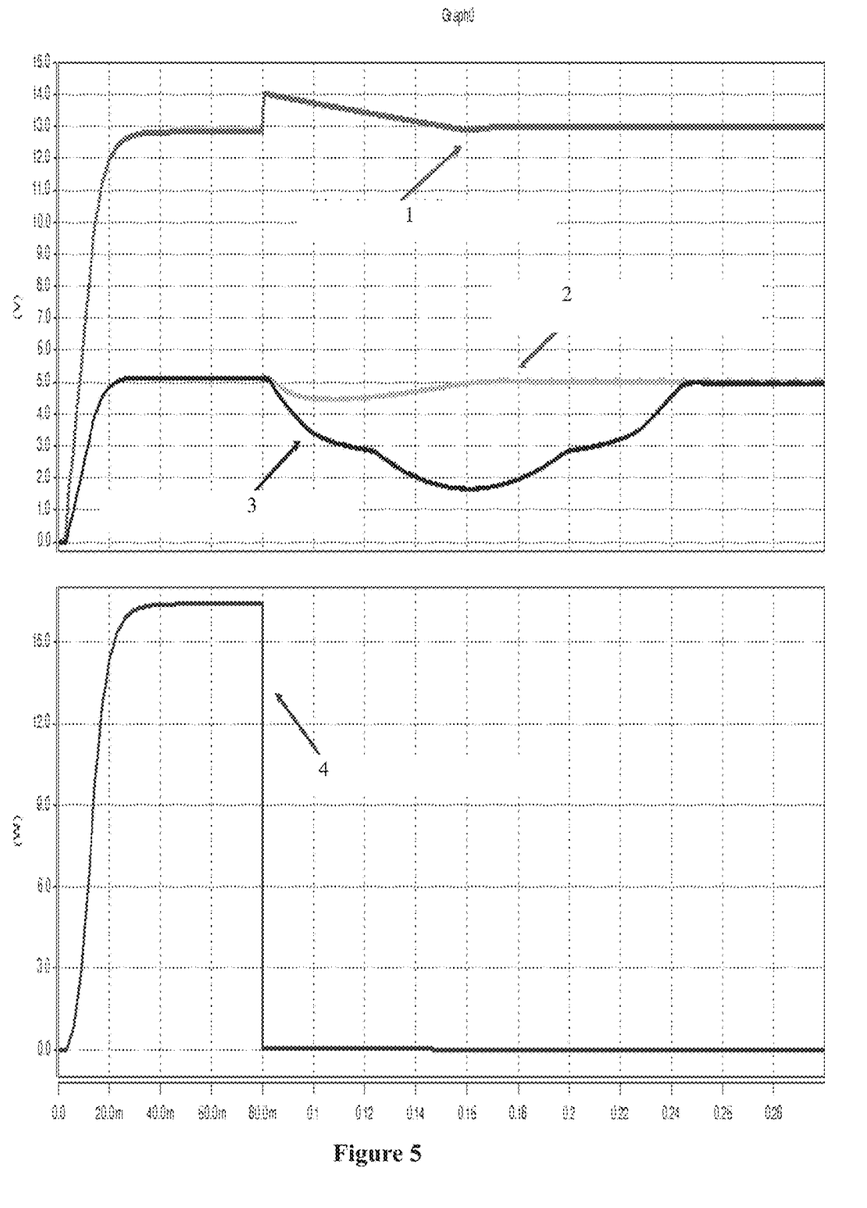
FIG. 5 is a simulated waveform diagram for the feedback device for a power supply shown in FIG. 2.

FIG. 3 and FIG. 4 are analysis diagrams of the operating principle of the feedback device for a power supply shown in FIG. 2 in stable operation and in voltage fluctuation, respectably. FIG. 5 is a simulated waveform diagram for the feedback device for a power supply shown in FIG. 2. The principle of the feedback device for a power supply as shown in FIG. 2 is described below in conjunction with FIGS. 3 to 5.

As shown in FIG. 3, when the power supply feedback device is in stable operation, the voltages on the first auxiliary output branch 131 and the second auxiliary output branch 132 do not fluctuate, and the diodes D6 and D8 are off. Only the main feedback module 150 samples the voltage on the main output branch 120. In this case, the resistor R1 and the resistors R2 and R3 form a path, and the main feedback voltage is transmitted to a voltage regulating chip U1 via the resistor R14, and then to a flyback driver D via an optocoupler U2. The flyback driver D generates, based on the main feedback voltage, a flyback drive signal for driving the gate of the switching tube of the flyback converter, to control the converter module 110 by controlling the duty cycle of the drive signal.

As shown in FIG. 4, when either one or both of the voltage on the first auxiliary output branch 131 and the voltage on the second auxiliary output branch 132 vary (decrease), the diode D6 and/or the diode D8 are turned on. In this case, the voltage on the main output branch sampled by the main feedback module 150 causes a current to flow through the resistors R1-R3. In this case, since the diode D6 and/or the diode D8 are on, at the feedback shunting point l of the feedback control module, a current flows into the first auxiliary feedback module 161 and/or the second auxiliary feedback module 162, and as a result, the currents flowing through the resistor R3 and resistor R14 decrease, and thus the main feedback voltage received by the feedback control module 150 decreases accordingly. The decreased main feedback voltage is transmitted to the voltage regulating chip U1 via the resistor R14, and then to the flyback driver D via the optocoupler U2. The flyback driver D generates, based on the main feedback voltage, a flyback drive signal for driving the gate of the switching tube of the flyback converter, to control the converter module 110 by controlling the duty cycle of the drive signal, so as to improve the power output and restore the voltage on the auxiliary output branch 161 and/or the voltage on the auxiliary output branch 162 to normal. Therefore, when the voltage on either of the auxiliary output branches decreases, the flyback driver D can increase the PWM duty cycle for controlling the switching tube to increase energy transfer, thereby making the voltage sag on the auxiliary output branch to be very small, and allowing it to be rapidly restored to its normal range.

The simulated waveform diagram of FIG. 5 shows clearly the advantages of the power supply feedback device of the present invention. In FIG. 5, 1 denotes the waveform of the voltage on the main output branch; 2 is the waveform diagram of the voltage on an auxiliary output branch of a power supply to which the power supply feedback device of the present invention is applied; and 3 is the waveform diagram of the voltage on an auxiliary output branch of a power supply in the prior art. 4 illustrates the waveform of a corresponding variation of a load. According to FIG. 5, when the load exhibits a variation as the waveform variation represented by 4, if the power supply feedback module in the prior art is applied, i.e., the auxiliary output branch does not have auxiliary feedback regulation, the waveform diagram of the voltage on the auxiliary output branch exhibits a variation as represented by 3. On the other hand, if the power supply feedback module of the present invention is applied, i.e., the auxiliary output branch has auxiliary feedback regulation, the waveform diagram of the voltage on the auxiliary output branch exhibits a variation as represented by 4. As can be seen from a comparison between 3 and 4, if the power supply feedback module in the prior art is used, when the load of the auxiliary output branch varies significantly, there is a significant voltage sag in the auxiliary output branch, which is greater than 70% and lasts for a longer period of time, thus resulting in abnormal operation of the subsequent-stage circuit. However, if the power supply feedback module of the present invention is used, when the load of the auxiliary output branch varies significantly, there is a small voltage sag in the auxiliary output branch, which is approximately 10% and does not affect the subsequent-stage circuit.

Therefore, by using the power supply feedback device of the present invention, the voltages on the main output branch and a plurality of auxiliary output branches can be monitored in real time, and when the voltage on any one of the output branches decreases, the PWM duty cycle of the transformer module can be timely adjusted by the feedback control module, thus offering good adaptivity. Moreover, the circuit is simple. Voltage sag problems are well solved, and the power density and cost are both ensured.

Figure 6:
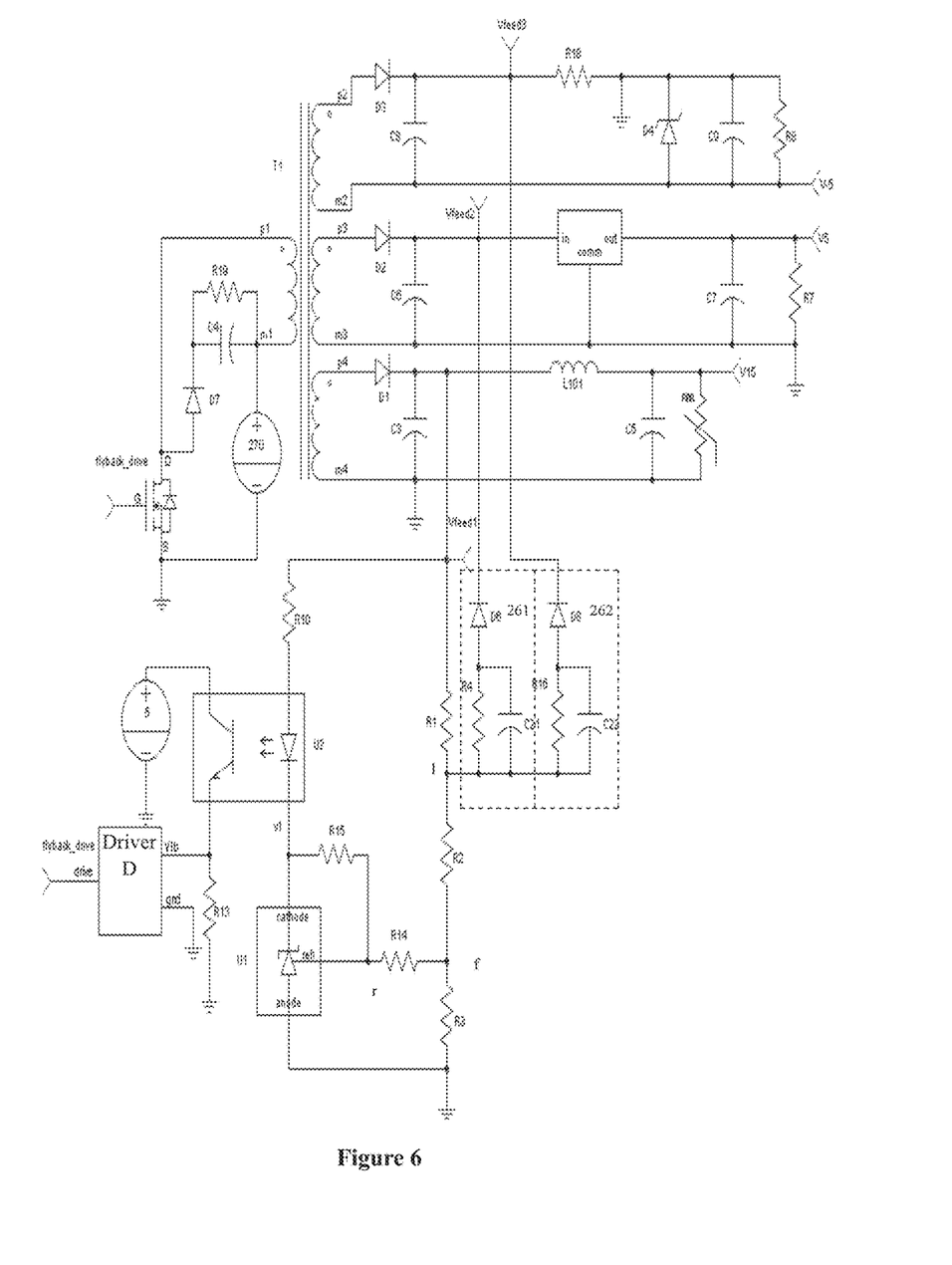
FIG. 6 is a schematic circuit diagram of a feedback device for a power supply according to a third embodiment of the present invention.

FIG. 6 is a schematic circuit diagram of a feedback device for a power supply according to a third embodiment of the present invention. The power supply feedback device shown in FIG. 6 differs from the power supply feedback device shown in FIG. 2 only in the structures of the first auxiliary feedback module and the second auxiliary feedback module. Accordingly, only the first auxiliary feedback module 261 and the second auxiliary feedback module 262 as shown in FIG. 6 are described here. For the rest components of the circuit and their principles, please refer to the descriptions of FIGS. 2 to 5.

As shown in FIG. 6, the first auxiliary feedback module 261 includes a diode D6, a resistor R4 and a capacitor C21. The diode D6 has a cathode connected to the auxiliary feedback sampling point Vfeed2 of the first auxiliary output branch 131, and an anode connected to the feedback shunting point 1 of the feedback control module via the resistor R4. The capacitor C21 has a positive terminal connected to the anode of the diode D6, and a negative terminal connected to the feedback shunting point 1 of the feedback control module. The second auxiliary feedback module 262 includes a diode D8, a resistor R16 and a diode C22. The diode D8 has a cathode connected to the auxiliary feedback sampling point Vfeed3 of the second auxiliary output branch 132, and an anode connected to the feedback shunting point 1 of the feedback control module via the resistor R16. The capacitor C22 has a positive terminal connected to the anode of the diode D8, and a negative terminal connected to the feedback shunting point 1 of the feedback control module.

In addition, those skilled in the art understand that, the capacitor C21 may be connected in series with one or a plurality of resistors and then connected, together with the one or plurality of resistors, in parallel to the resistor R4, and the capacitor C22 may be connected in series with one or a plurality of resistors and then connected, together with the one or plurality of resistors, in parallel to the resistor R16.

Figure 7:
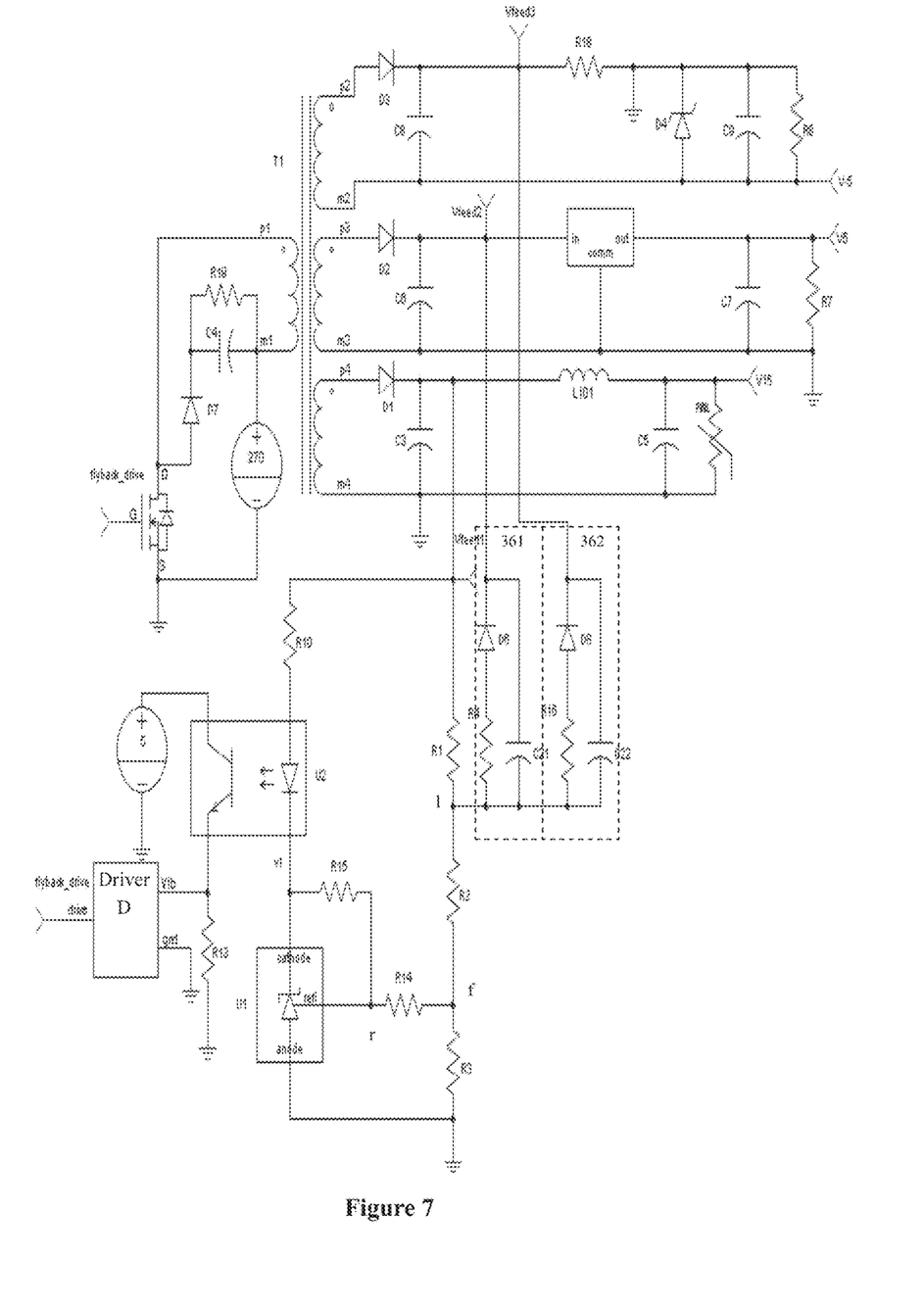
FIG. 7 is a schematic circuit diagram of a feedback device for a power supply according to a fourth embodiment of the present invention.

FIG. 7 is a schematic circuit diagram of a feedback device for a power supply according to a fourth embodiment of the present invention. The power supply feedback device shown in FIG. 7 differs from the power supply feedback device shown in FIG. 2 only in the structures of the first auxiliary feedback module and the second auxiliary feedback module. Accordingly, only the first auxiliary feedback module 361 and the second auxiliary feedback module 362 as shown in FIG. 7 are described here. For the rest components of the circuit and their principles, please refer to the descriptions of FIGS. 2 to 5.

As shown in FIG. 7, the first auxiliary feedback module 361 includes a diode D6, a resistor R4 and a capacitor C21. The diode D6 has a cathode connected to the auxiliary feedback sampling point Vfeed2 of the first auxiliary output branch 131, and an anode connected to the feedback shunting point 1 of the feedback control module via the resistor R4. The capacitor C21 has a positive terminal connected to the cathode of the diode D6, and a negative terminal connected to the feedback shunting point 1 of the feedback control module. The second auxiliary feedback module 362 includes a diode D8, a resistor R16 and a diode C22. The diode D8 has a cathode connected to the auxiliary feedback sampling point Vfeed3 of the second auxiliary output branch 132, and an anode connected to the feedback shunting point 1 of the feedback control module via the resistor R16. The capacitor C22 has a positive terminal connected to the cathode of the diode D8, and a negative terminal connected to the feedback shunting point 1 of the feedback control module.

Figure 8:
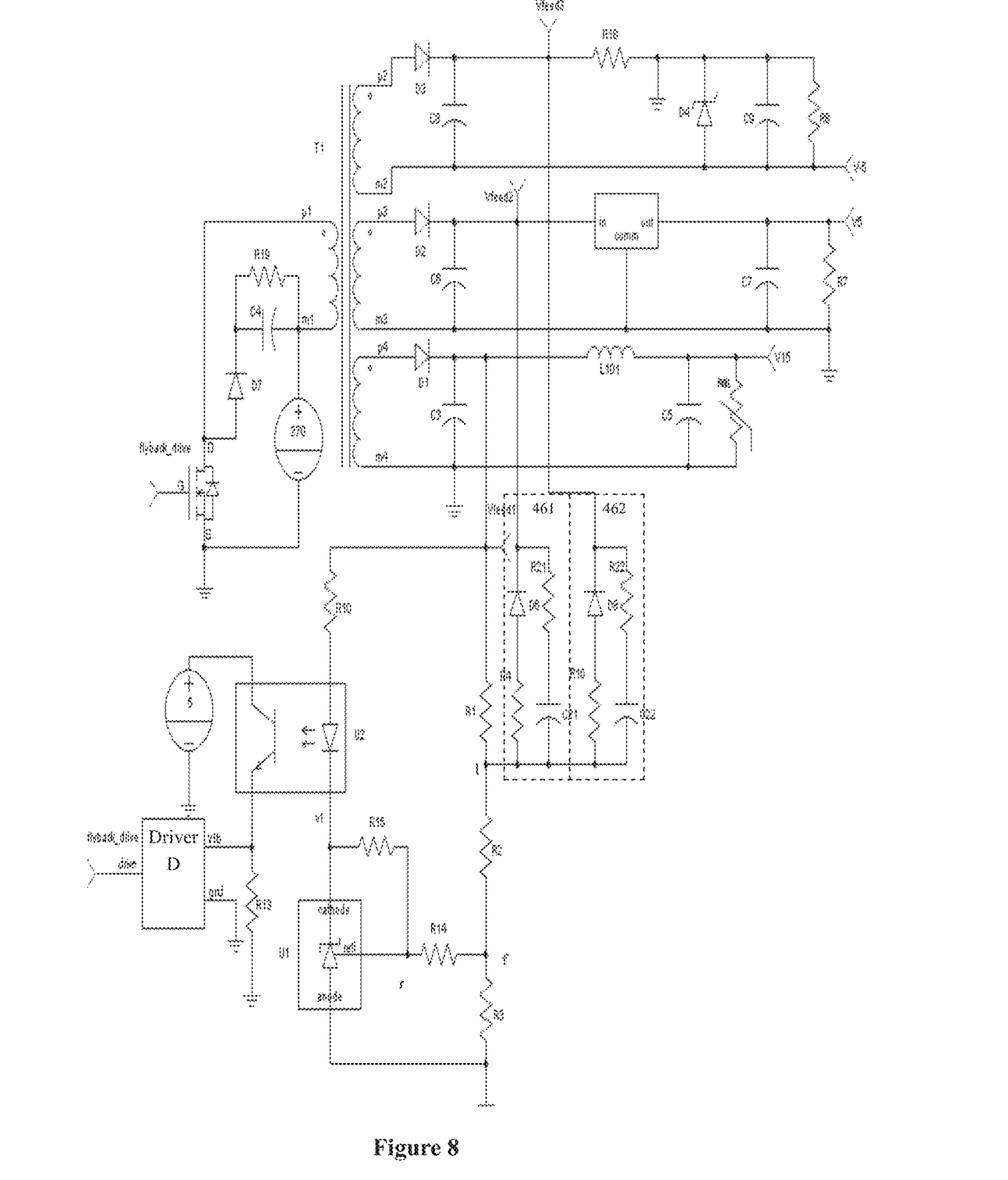
FIG. 8 is a schematic circuit diagram of a feedback device for a power supply according to a fifth embodiment of the present invention.

FIG. 8 is a schematic circuit diagram of a feedback device for a power supply according to a fifth embodiment of the present invention. The power supply feedback device shown in FIG. 8 differs from the power supply feedback device shown in FIG. 2 only in the structures of the first auxiliary feedback module and the second auxiliary feedback module. Accordingly, only the first auxiliary feedback module 461 and the second auxiliary feedback module 462 as shown in FIG. 8 are described here. For the rest components of the circuit and their principles, please refer to the descriptions of FIGS. 2 to 5.

As shown in FIG. 8, the first auxiliary feedback module 461 includes a diode D6, resistors R4 and R21, and a capacitor C21. The diode D6 has a cathode connected to the auxiliary feedback sampling point Vfeed2 of the first auxiliary output branch 131, and an anode connected to the feedback shunting point l of the feedback control module via the resistor R4. The capacitor C21 has a positive terminal connected to the cathode of the diode D6 via the resistor R21, and a negative terminal connected to the feedback shunting point l of the feedback control module. The second auxiliary feedback module 462 includes a diode D8, resistors R16 and R22, and a diode C22. The diode D8 has a cathode connected to the auxiliary feedback sampling point Vfeed3 of the second auxiliary output branch 132, and an anode connected to the feedback shunting point l of the feedback control module via the resistor R16. The capacitor C22 has a positive terminal connected to the cathode of the diode D8 via the resistor R22, and a negative terminal connected to the feedback shunting point l of the feedback control module.

Further, those skilled in the art understand that the resistor R21 may be connected between the negative terminal of the capacitor C21 and the feedback shunting point l of the feedback control module. Likewise, the resistor R22 may be connected between the negative terminal of the capacitor C22 and the feedback shunting point l of the feedback control module. The capacitor C21 and the capacitor C22 may also be connected in series or in parallel with two or more resistors.

Moreover, various implementations of the auxiliary feedback module are shown in FIG. 2 and FIGS. 6 to 8, and those skilled in the art understand that, these implementations of the auxiliary feedback module can be used for different auxiliary output branches in the same power supply. In addition, the power supply feedback device of the present invention can be applied to any power supply having an auxiliary output branch.

Those skilled in the art further understand that the number of auxiliary feedback modules of the power supply feedback device of the present invention can be determined according to the number of auxiliary output branches of the power supply. As a matter of course, in various embodiments of the present invention, the number of auxiliary feedback modules of the power supply feedback device of the present invention may be smaller than or equal to the number of auxiliary output branches of the power supply.

Although the present invention has been described above with the specific embodiments, those skilled in the art should understand that various modifications and equivalent alternations can be made to the present invention without departing from the scope of the present invention. Accordingly, the present invention is not limited to the specific embodiments disclosed herein, but shall include all embodiments falling within the scope of the present invention as defined by the claims attached herein.

The invention claimed is:

1. A power supply, comprising:
a main output branch;
an auxiliary output branch;
a main feedback circuit coupled to the main output branch, the main feedback circuit including a first resistor and a second resistor connected in series between the main output branch and a feedback control circuit; and
an auxiliary feedback circuit coupled to the auxiliary output branch, the auxiliary feedback circuit including a diode and a capacitor, the diode coupled between the auxiliary output branch and a first node defined between the first resistor and the second resistor of the main feedback circuit, the capacitor coupled in parallel with the diode or coupled in series between the anode of the diode and the first node of the main feedback circuit;
wherein the main feedback circuit is adapted to sample a voltage on the main output branch, and output a main feedback voltage to the feedback control circuit;
wherein the auxiliary feedback circuit is adapted to reduce the main feedback voltage when a voltage on the auxiliary output branch drops below the voltage at the main output branch; and
wherein the feedback control circuit is adapted to control the power supply to increase its power output when the main feedback voltage is reduced by the auxiliary feedback circuit, so that the voltage on the auxiliary output branch is increased.

2. The power supply according to claim 1, wherein:
the main feedback circuit further comprises a third resistor and a fourth resistor;
the first resistor, the second resistor and the third resistor are sequentially connected in series between a main feedback sampling node of the main output branch and ground; and
the fourth resistor has one terminal connected to a feedback output node of the main feedback circuit and the other terminal connected to a feedback receiving node of the feedback control circuit.

3. The power supply according to claim 2, wherein the feedback output node is arranged between the second resistor and the third resistor of the main feedback circuit.

4. The power supply according to claim 2, wherein the auxiliary feedback circuit is one of at least two auxiliary feedback circuits and the auxiliary output branch is one of at least two auxiliary output branches, the at least two auxiliary feedback circuits in one-to-one correspondence with the at least two auxiliary output branches.

5. The power supply according to claim 2, wherein the auxiliary feedback circuit is connected between an auxiliary feedback sampling node of the auxiliary output branch and the first node of the main feedback circuit, and the diode is adapted to turn on when the voltage on the auxiliary output branch of the power supply drops, so as to shunt a main feedback current flowing through the main feedback circuit and reduce the main feedback voltage.

6. The power supply according to claim 5, wherein the anode of the diode is connected directly or via a fifth resistor to the first node of the main feedback circuit.

7. The power supply according to claim 6, wherein:
the auxiliary feedback circuit further comprises a sixth resistor; and
the sixth resistor is connected in series with the capacitor, for limiting a current through the capacitor.

8. The power supply according to claim 7, wherein:
the sixth resistor is connected between a negative terminal of the capacitor and the first node of the main feedback circuit; or
the sixth resistor is connected to a positive terminal of the capacitor and the cathode of the diode; or the sixth resistor is connected between the positive terminal of the capacitor and the anode of the diode.

9. The power supply according to claim 8, wherein the feedback shunting node is arranged between a first resistor and a second resistor of the main feedback circuit.

10. The power supply according to claim 8, wherein the auxiliary feedback circuit is one of at least two auxiliary feedback circuits and the auxiliary output branch is one of at least two auxiliary output branches, the at least two auxiliary feedback circuits in one-to-one correspondence with the at least two auxiliary output branches.

11. The power supply according to claim 7, wherein the feedback shunting node is arranged between a first resistor and a second resistor of the main feedback circuit.

12. The power supply according to claim 7, wherein the auxiliary feedback circuit is one of at least two auxiliary feedback circuits and the auxiliary output branch is one of at least two auxiliary output branches, the at least two auxiliary feedback circuits in one-to-one correspondence with the at least two auxiliary output branches.

13. The power supply according to claim 6, wherein the feedback shunting node is arranged between a first resistor and a second resistor of the main feedback circuit.

14. The power supply according to claim 6, wherein the auxiliary feedback circuit is one of at least two auxiliary feedback circuits and the auxiliary output branch is one of at least two auxiliary output branches, the at least two auxiliary feedback circuits in one-to-one correspondence with the at least two auxiliary output branches.

15. The power supply according to claim 5, wherein the feedback shunting node is arranged between a first resistor and a second resistor of the main feedback circuit.

16. The power supply according to claim 5, wherein the auxiliary feedback circuit is one of at least two auxiliary feedback circuits and the auxiliary output branch is one of at least two auxiliary output branches, the at least two auxiliary feedback circuits in one-to-one correspondence with the at least two auxiliary output branches.

17. The power supply according to claim 1, wherein the auxiliary feedback circuit is one of at least two auxiliary feedback circuits and the auxiliary output branch is one of at least two auxiliary output branches, the at least two auxiliary feedback circuits in one-to-one correspondence with the at least two auxiliary output branches.

18. A power supply comprising:
a main output branch;
an auxiliary output branch;
a ground terminal;
a feedback control circuit adapted to control operation of the power supply;
a main feedback circuit coupled between the main output branch and the feedback control circuit to provide a main feedback voltage to the feedback control circuit, the main feedback circuit including a first resistor, a second resistor, and a third resistor connected sequentially in series between the main output branch of the power supply and the ground terminal, the main feedback circuit including a fourth resistor coupled between the feedback control circuit and a node defined between the second resistor and the third resistor; and
an auxiliary feedback circuit, the auxiliary feedback circuit including a diode and a capacitor, the diode coupled between the auxiliary output branch and a second node defined between the first resistor and the second resistor of the main feedback circuit, the capacitor coupled in parallel with the diode or coupled in series between the anode of the diode and the second node, the auxiliary feedback circuit adapted to reduce the main feedback voltage provided to the feedback control circuit when a voltage at the auxiliary output branch is reduced below a voltage at the main output branch;
wherein the feedback control circuit is adapted to increase a power output of the power supply when the main feedback voltage is reduced by the auxiliary feedback circuit, thereby increasing the voltage at the auxiliary output branch.

19. A power supply comprising:
a main output branch;
an auxiliary output branch;
a main feedback circuit coupled to the main output branch, the main feedback circuit including a first resistor and a second resistor connected in series between the main output branch and a feedback control circuit; and
an auxiliary feedback circuit coupled to the auxiliary output branch, the auxiliary feedback circuit including a diode and a capacitor, the diode having a cathode coupled directly to the auxiliary output branch and the diode coupled between the auxiliary output branch and a first node defined between the first resistor and the second resistor of the main feedback circuit, the capacitor coupled in parallel with the diode or coupled in series between the anode of the diode and the first node of the main feedback circuit;
wherein the main feedback circuit is adapted to sample a voltage on the main output branch, and output a main feedback voltage to the feedback control circuit;
wherein the auxiliary feedback circuit is adapted to reduce the main feedback voltage when a voltage on the auxiliary output branch drops below the voltage at the main output branch; and
wherein the feedback control circuit is adapted to increase a power output of the power supply when the main feedback voltage is reduced by the auxiliary feedback circuit, thereby increasing the voltage at the auxiliary output branch.

* * * * *